US011884131B2

(12) United States Patent
Chopard et al.

(10) Patent No.: US 11,884,131 B2
(45) Date of Patent: Jan. 30, 2024

(54) THERMAL-MANAGEMENT SYSTEM FOR A VEHICLE

(71) Applicant: HUTCHINSON, Paris (FR)

(72) Inventors: Fabrice Chopard, Saint Martin D'Heres (FR); Hélder Filipe De Campos Garcia, Chalette sur Loing (FR); Ibrahim Abdallah, Montargis (FR)

(73) Assignee: HUTCHINSON, Paris (FR)

( * ) Notice: Subject to any disclaimer, the term of this patent is extended or adjusted under 35 U.S.C. 154(b) by 461 days.

(21) Appl. No.: 17/290,613

(22) PCT Filed: Oct. 25, 2019

(86) PCT No.: PCT/FR2019/052555
§ 371 (c)(1),
(2) Date: Apr. 30, 2021

(87) PCT Pub. No.: WO2020/089551
PCT Pub. Date: May 7, 2020

(65) Prior Publication Data
US 2021/0394580 A1 Dec. 23, 2021

(30) Foreign Application Priority Data
Oct. 31, 2018 (FR) ...................................... 1860089

(51) Int. Cl.
*B60L 53/10* (2019.01)
*B60H 1/00* (2006.01)
(Continued)

(52) U.S. Cl.
CPC ....... *B60H 1/0073* (2019.05); *B60H 1/00492* (2013.01); *B60H 1/00735* (2013.01);
(Continued)

(58) Field of Classification Search
CPC .............. B60H 1/0073; B60H 1/00492; B60H 1/00735; B60H 1/00878; B60L 58/12;
(Continued)

(56) References Cited

U.S. PATENT DOCUMENTS

2010/0107635 A1 5/2010 Tsubone

FOREIGN PATENT DOCUMENTS

| WO | WO 2012/002275 A1 | 1/2012 |
| WO | WO 2012/002286 A1 | 1/2012 |
| WO | WO 2018/069629 A1 | 4/2018 |

OTHER PUBLICATIONS

International Patent Application No. PCT/FR2019/052555, International Search Report and Written Opinion dated Jan. 20, 2020, 18 pgs.

*Primary Examiner* — Mathew Franklin Gordon
(74) *Attorney, Agent, or Firm* — Cozen O'Connor

(57) ABSTRACT

The invention relates to a thermal-management system for a vehicle comprising:
  at least one calories storage and/or frigories storage (S1, S2),
  at least one element of the vehicle to be heated or cooled,
  at least one source of calories or frigories,
  detection means adapted to detect whether calories or frigories are available at one of the said sources,
  control means able to distribute the calories or frigories available at the sources to the elements to be heated or cooled, according to transient and nominal needs.
  characterized in that it comprises prediction means capable of making at least one prediction aimed at determining:
  whether calories or frigories will be available at a later date from any of the said sources and/or,
(Continued)

whether a need for calories or frigories will exist at a later date at one of the said elements to be heated or cooled.

17 Claims, 13 Drawing Sheets

(51) Int. Cl.
| | |
|---|---|
| *B60L 58/12* | (2019.01) |
| *B60L 58/16* | (2019.01) |
| *B60L 1/02* | (2006.01) |
| *G05B 19/4155* | (2006.01) |
| *G06Q 30/0201* | (2023.01) |
| *G06Q 50/30* | (2012.01) |
| *G07C 5/08* | (2006.01) |
| *G08G 1/14* | (2006.01) |

(52) U.S. Cl.
CPC ............ *B60H 1/00878* (2013.01); *B60L 1/02* (2013.01); *B60L 53/10* (2019.02); *B60L 58/12* (2019.02); *B60L 58/16* (2019.02); *G05B 19/4155* (2013.01); *G06Q 30/0201* (2013.01); *G06Q 50/30* (2013.01); *G07C 5/08* (2013.01); *G08G 1/143* (2013.01); *G05B 2219/50333* (2013.01)

(58) Field of Classification Search
CPC . B60L 58/16; B60L 53/10; B60L 1/02; G05B 19/4155; G05B 2219/50333; G06Q 30/0201; G06Q 50/30; G07C 5/08; G08G 1/143
See application file for complete search history.

THERMAL-MANAGEMENT SYSTEM FOR A VEHICLE

CROSS-REFERENCE TO RELATED APPLICATIONS

This application is a 35 U.S.C. § 371 filing of International Application No. PCT/FR2019/052555 filed Oct. 25, 2019, which claims the benefit of priority to French Patent Application No. 1860089 filed Oct. 31, 2018, each of which is incorporated herein by reference in its entirety.

FIELD OF THE INVENTION

The present invention relates to a thermal-management system for a vehicle and a corresponding management method.

BACKGROUND OF THE INVENTION

The known thermal-management systems are suitable for heating or cooling (air conditioning) the passenger compartment of a vehicle, as well as for heating or cooling a vehicle component, such as the battery.

Electric vehicles use electric engines coupled to inverters powered in turn by on-board batteries, which tend to heat up when used, discharged or recharged. In addition, a hybrid vehicle also includes an internal combustion engine capable of driving the vehicle, alternately or in addition to the electric engines.

In order to ensure the optimal operation of these components, it is useful to condition them thermally, i.e., to keep their temperature within a certain range during nominal operation and to reach this range as quickly as possible during transient operating conditions (e.g. during start-up). For example, for Li+ batteries (i.e. lithium batteries), the operating temperature range is between 0° C. and 55° C., preferably between 15° C. and 35° C. This optimum operating range varies according to the chemical composition of the battery. Specifically, solid-state batteries have an operating temperature range that exceeds 100° C.

At the same time, the system must also be able to ensure effective conditioning of the passenger compartment, particularly when the outside air is relatively cold or hot. There is a need to be able to quickly condition the passenger compartment, especially when the passenger compartment is at temperatures far below the comfort temperature desired by the user.

Document WO 2018/069629, submitted by the Applicant, divulges a system for the thermal conditioning of a passenger compartment and/or at least one component of a motor vehicle.

This system, shown in FIG. 1, comprises a circuit 1 for circulating a heat-transfer fluid, such as glycol water for example.

The heat-transfer fluid circuit 1 comprises:
a first pump P1,
a second pump P2,
a first heat exchanger E1, capable of exchanging heat with a refrigerant fluid,
a second heat exchanger E2, capable of exchanging heat with air,
a third heat exchanger E3, capable of exchanging heat with air,
a calories storage S1 (also called hot storage),
a frigories storage S2 (also known as cold storage),
first heating means RE1 for heating the heat-transfer fluid, such as an electrical resistor, for example,
second heating means RE2 for heating the heat-transfer fluid, such as an electrical resistor, for example,
check valves C1, C2, C3, C4, C5, C6,
three-way valves V1, V2, V3, V4, V5, V6, V9, the different channels of these valves can be actuated and thermostatically controlled,
shut-off valves V7, V8, which can be actuated and thermostatically controlled,
heating and/or cooling means M1 for a first vehicle component, such as at least one vehicle battery,
heating and/or cooling means M2 for a second vehicle component, such as at least one electric engine of the vehicle and/or associated components such as an inverter for example,
heating and/or cooling means M3 for a third component of the vehicle, such as a vehicle internal combustion engine, in particular for heating and/or cooling the oil circuit of the internal combustion engine.

In particular, circuit 1 of the heat-transfer fluid comprises:
a portion P1 forming a loop extending from the inlet of the pump P1 to the outlet of the pump P1 and comprising successively, starting from the outlet of the pump P1, the valve V6, the valve V5, the valve V4, the valve V3, a branch or connection point R1, the valve V1, the pump P2, a branch R2, the check valve C2, the exchanger E1, the valve V9, a branch R3, the exchanger E2, the valve V7, a branch R4, a branch R5, a branch R6, a branch R7, a branch R8, the third exchanger E3, the check valve C1 and the pump P1,
a bypass portion P2 connecting branch R2 to valve V9,
a bypass portion P3 connecting branch R3 to branch R4, the said portion P3 including shut-off valve V8,
a bypass portion P4 connecting branch R5 to valve V3,
a portion P5 connecting branch R6 to valve V4, the said portion P5 comprising, from the branch R6 to the valve V4, the heating and/or cooling means M1 and the heating means R1,
a portion P6 connecting branch R7 to valve V5, the said portion P6 including the heating and/or cooling means M2,
a portion P7 connecting branch R8 to valve V6, the said portion P7 including the heating and/or cooling means M3.

The system also includes a circuit 2 for circulating a refrigerant fluid.

The refrigerant fluid is for example of the super-critical fluid type, such as carbon dioxide, for example, known as R744. It can also be a subcritical fluid, such as the hydrofluorocarbon known as R134a or a refrigerant fluid with a low greenhouse gas impact, i.e. capable of providing a sustainable solution for automotive air conditioners, known as HFO1234yf.

The circuit 2 circulating a refrigerant fluid comprises:
a compressor C,
a fourth heat exchanger E4, capable of forming a condenser,
a fifth heat exchanger E5, capable of forming an evaporator and/or condenser,
a sixth heat exchanger E6, capable of forming an evaporator,
a first regulator D1,
a second regulator D2,
a third regulator D3,
an accumulator A, three-way valves V11, V12, the various ways of which can be actuated and thermostatically controlled, shut-off valves V10, V13, V14, which can be actuated and thermostatically controlled.

The regulators D1, D2, D3 can be of type fixed pressure drop and/or variable opening or of type variable pressure drop, the said opening or pressure drop being capable of being regulated by means of control not shown.

More specifically, the circuit 2 circulating a refrigerant fluid comprises:

a portion P'1 forming a loop extending from the inlet of the compressor C to the outlet of the compressor C and comprising successively, starting from the outlet of the compressor C, the exchanger E4, a branch R'1, the regulator D1, a branch R'2, the valve V11, the exchanger E5, a branch R'3, a branch R'4, the valve V13, a branch R'5, the regulator D2, a branch R'6, the exchanger E1, a branch R'7, a branch R'8, the accumulator A and the compressor C, a bypass portion P'2 connecting the branch R'1 to the branch R'2, the said portion P'2 including the valve V10, a bypass portion P'3 connecting the valve V11 to the branch R'3, a portion P'4 connecting the branch R'4 to the branch R'7 and comprising, from the branch R'4 to the branch R'7, the valve V12, the regulator D3 and the exchanger E6, a bypass portion P'5 connecting the valve V12 to the branch R'8.

The exchangers E2, E4, E6 are located in an air circulation duct 3 of a H.V.A.C. (Heating, Ventilation and Air-Conditioning, the said duct 3 being intended to open into the passenger compartment of the vehicle.

Duct 3 has an upstream zone into which air from outside the vehicle is introduced, a middle zone, and a downstream zone. The terms "upstream" and "downstream" are defined in relation to the direction of airflow in the duct, this direction being represented by arrows in FIG. 1. The exchanger E6 is mounted in the upstream zone 3a of duct 3. The exchanger E2 is mounted in the downstream zone 3b of duct 3. The middle zone is separated into two channels, namely a first channel 3c in which the exchanger E4 is mounted, and a second channel 3d. The two channels 3c and 3d meet in the downstream zone 3b of duct 3. Means of heating, such as, for example, an electrical resistor, are mounted in channel 3c, for example downstream of the exchanger E4.

A VT shutter whose position is controlled is located upstream of channels 3c and 3d and allows the fluid to flow selectively in channel 3c or channel 3d. The VT shutter can also circulate a specific part of the fluid in channel 3c and a specific part of the fluid in channel 3d.

the system also includes a fan F1 to force the passage of outside air through exchangers E3 and E5, located for example on the front of the vehicle, and a second fan F2, mounted for example in the upstream zone 3a of duct 3, so as to force the passage of air through duct 3.

The pumps P1, P2, the compressor C and the fans F1, F2 are driven by electric engines.

the system also includes sensors for measuring, for example, the temperature, the flow rate and/or the pressure of the heat-transfer fluid, refrigerant fluid and/or air, the control means for controlling the various actuators (motors, valves, etc.) and the calculation means, in particular with the information from the said sensors as input, for outputting information to the said control means.

Of course, the embodiment illustrated in FIG. 1 is not exhaustive, other embodiments can be considered to perform the functions described below.

As described in WO 2018/069629 such a system is capable of operating in numerous modes of operation aimed at ensuring the thermal-management of the various elements of the system, according to needs.

SUMMARY OF THE INVENTION

There is a need to further improve the performance of such a system.

To this end, the invention relates to a thermal-management system for a vehicle comprising:

at least one calories storage and/or frigories storage, forming a source of calories or frigories, at least one element of the vehicle to be heated or cooled, at least one additional source of calories or frigories, detection means adapted to detect whether calories or frigories are available at one of the said sources, control means able to distribute the calories or frigories available at the sources to the elements to be heated or cooled, according to transient or nominal needs, characterized in that it comprises prediction means capable of making at least one prediction aimed at determining:

whether calories or frigories will be available at a later date from any of the said sources and/or, whether a need for calories or frigories will exist at a later date at one of the said elements to be heated or cooled.

The prediction means thus make it possible to adapt the operation of the system, not only to the data and constraints of the various elements of the system detected in real-time, but to predictions making it possible to adapt the behaviour of the system to future constraints or opportunities, such as the availability or subsequent lack of calories or frigories at a source for example.

In addition, the control and command means make it possible to adapt the operation of the system according to:

transient needs; these are needs that arise over a short period of time and lead to a nominal functioning at a steady state;

nominal needs to maintain a steady state.

In particular, predictions are made by taking into account the data collected about each user's profile.

The system can include management means capable of:

defining a thermal need for one or more of the elements of the vehicle to be heated or cooled and/or an electrical need for one or more of the elements of the vehicle to be supplied electrically, on the basis of input data relating to the state of the elements of the vehicle to be heated or cooled, and relating to the state of the sources of calories or frigories, of a request from a user and/or of a prediction, defining an operating mode of the system on the basis of the said thermal need, the said electrical need and/or a prediction, operate the system's actuators, so as to operate the system according to the chosen operating mode.

The actuators comprise, for example, at least one pump, at least one compressor, at least one controlled valve and/or at least one electrical resistor.

The thermal need is, for example, the need to heat or cool one of the elements of the system or the vehicle, such as a battery, an internal combustion engine, or electrical or electronic components. The thermal need can also include information about the amount of heating or cooling to be performed. The thermal need can also be neutral, i.e., no heating or cooling of the element concerned is required. A thermal need can be associated with each of the elements to be heated or cooled in the system.

The management means can be able to determine, from the said thermal need and/or, from the said electrical need, whether one or more conditions are met, the said conditions being intended to define whether thermal and/or electrical energy is available, and, according to the said conditions, to define the operating mode of the system.

The management means can be able to define an optimal operating mode of the system among several possible operating modes to meet a thermal and/or electrical need.

The optimal operating mode can be a compromise between, among others, the following parameters: user comfort, battery state of charge (affecting, among other things, the possibility of covering the remainder of a given journey, the possibility of completing a given journey with a sufficient battery state of charge for a subsequent journey), battery health.

The optimal operating mode can be designed to reduce the impact of external conditions (especially the outside temperature) on the above parameters.

The system can comprise control means capable of controlling actuators belonging to the system and allowing the distribution of the calories or frigories available at the sources to the elements to be heated or cooled. The control means act dynamically so as to maintain a measured or calculated value, for example the temperature of an element of the system or the vehicle, close to a set value.

The control means can include a PID controller, also known as a PID corrector (proportional, integral, derivative), a predictive control (MPC for Model Predictive Control), a fuzzy logic controller or an optimal control controller. Such control means are known from the field of automation and their operation will not be explained in detail.

The prediction means are adapted to calculate the subsequent availability of calories and/or frigories, and/or the subsequent need for calories and/or frigories from at least one of the following inputs:
  data related to the user's habits and/or comfort preferences, in particular:
    data related to the temperature of the vehicle's passenger compartment usually desired by the user,
    the airflow rate usually desired by the user in the passenger compartment,
    distribution of the airflow usually desired by the user in the passenger compartment, between different air entry points in the passenger compartment, such as air vents,
    distribution between the fresh air from outside the passenger compartment and the recycled air from the passenger compartment, usually desired by the user,
    the orientation of the air vents usually desired by the user,
  data related to the user's driving habits and/or preferences, in particular:
    data related to the vehicle's speed,
    vehicle's running time,
    vehicle's downtime,
    vehicle's acceleration,
    speed of an internal combustion engine or electric engine of the vehicle,
  data related to the user's journey, in particular:
    geographical coordinates of the place of departure and/or the place of arrival planned or provided by the user,
    real-time geographical coordinates of the vehicle,
    meteorological data, such as wind speed and direction, temperature, rainfall, humidity, in particular along the journey, the parking place and/or the planned arrival place,
    traffic conditions along the journey,
    probability that the user will connect to an electric charging station of the vehicle's electric battery within a given time period,
  data related to the health of the battery,
  data related to the state of charge of a battery, in particular:
    type of battery charge, such as fast charge or normal charge,
    expected charging time.

Of course, the above list is not exhaustive and other types of data can be used.

The prediction means can use theoretical models and/or machine-learning models, for example using an artificial neural network, or can use databases and be based on pre-existing data. It is also possible to use a model based on mathematical equations that simulate the behaviour of the various components of the system or vehicle.

At least one heat and/or cold source also forms an element to be heated or cooled, according to the operating conditions of the vehicle.

The system can include at least one calories storage and at least one frigories storage.

The storage means can include a phase-change material, for example water, glycol, saline solution or paraffin. In particular, the phase-change material (PCM) can consist of n-hexadecane, eicosane or a lithium salt, all having melting points below 40° C. Alternatively, the PCM can be based, for example, on fatty acid, paraffin, or eutectic or hydrated salt, or even fatty alcohols. Such thermal storage means make it possible to accumulate thermal energy (calories or frigories) by latent heat (phase change) or by sensitive heat.

The system can comprise at least one battery capable of forming a heat or cold source and/or capable of forming a heating or cooling element.

The battery can be mounted in a housing containing a phase-change material capable of storing calories and/or frigories.

The system can comprise a device for heating, ventilating and/or conditioning a passenger compartment of the vehicle, comprising:
  a refrigerant fluid circuit
  a heat-transfer fluid circuit,
  a first heat exchanger capable of exchanging heat between the heat-transfer fluid and the air intended to enter the passenger compartment of the vehicle,
  a second heat exchanger capable of exchanging heat between the refrigerant fluid and air intended to enter the passenger compartment of the vehicle and capable of forming a condenser,
  a third heat exchanger capable of exchanging heat between the refrigerant fluid and air intended to enter the passenger compartment of the vehicle and capable of forming an evaporator,
  at least one fourth heat exchanger capable of exchanging heat between the refrigerant fluid and the heat-transfer fluid,
  the control means being able to distribute the calories or frigories between the sources and the elements to be heated or cooled, through the refrigerant fluid circuit, the heat-transfer fluid circuit and/or the said exchangers.

The heating, ventilation and/or conditioning device can comprise a fifth heat exchanger capable of exchanging heat between, firstly, the heat-transfer fluid or the refrigerant fluid and, secondly, hot gases from an exhaust line of the vehicle.

The battery can be capable of exchanging heat with the heat-transfer fluid.

The storage can be capable of exchanging heat with the heat-transfer fluid

The system can comprise a heat engine capable of exchanging heat with a heat-transfer fluid, for example, oil. The heat engine can be at least one element of the vehicle to be heated or cooled and/or at least one calories source.

The system can comprise at least one electrical resistor capable of exchanging heat with the air intended for the passenger compartment or with the aforementioned heat-transfer fluid.

The system can comprise at least one electrical element capable of exchanging heat with a heat-transfer fluid, the electrical element being an electrical machine and/or a power module capable of forming a heat source.

The system can include means for preconditioning the passenger compartment before the user enters the vehicle.

The system can include management means capable of using any surplus electrical energy contained in the vehicle battery, determined according to the prediction made, to supply an intelligent electric network external to the vehicle.

In an electrified vehicle, the predicted journey and/or comfort and the associated different thermal allowances can represent input variables for a predictive charging and discharging strategy of the battery and/or thermal storages. This strategy can be defined in the context of an intelligent management of the electric network, also called smart grid. Such management can include:

Recharge the calories storage during off-peak hours for a cold start during peak hours. Off-peak hours are defined as time slots where the cost of energy is low, as opposed to the so-called peak hours, where the cost of energy is high.

Manage battery energy according to the predicted needs of the journey.

Allocate excess electrical energy from the battery to the smart grid.

Optimize battery charging and allow the smart grid to prioritize other electrical needs.

The invention also relates to a method of thermal-management of a vehicle comprising a system of the aforementioned type, characterised in that it comprises the steps that consist in:

making at least one prediction to determine:
whether calories or frigories will be available at a later date from any of the said sources and/or,
whether a need for calories or frigories will exist at a later date at one of the said elements to be heated or cooled.
distributing the calories or frigories available at the sources to the elements to be heated or cooled, as required, in particular according to the said prediction.

The invention will be better understood and other details, characteristics and advantages of the invention will appear when reading the following description, which is given as a non-limiting example, with reference to the attached drawings.

DETAILED DESCRIPTION

Figure 1:
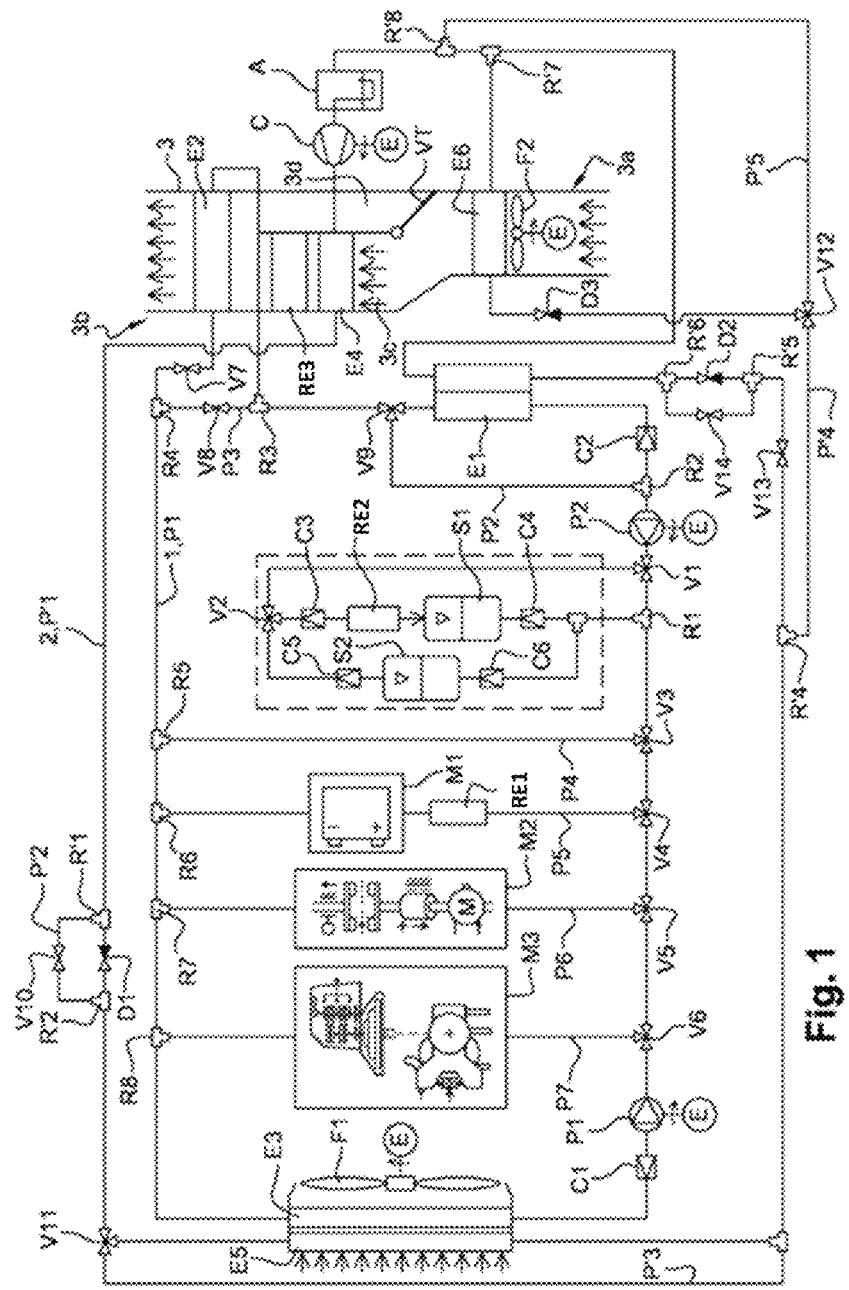
FIG. 1 is a system for the thermal conditioning of a passenger compartment and/or at least one component of a motor vehicle.

The thermal-management system of a vehicle in accordance with the invention is similar to that described with reference to FIG. 1.

The invention is aimed in particular at the thermal-management and operation of such a system.

It will be noted that the system according to the invention comprises detection and/or calculation means capable of detecting whether calories or frigories are available at at least one source of calories or frigories. These detection means include temperature, pressure, flow rate sensors, etc. and/or calculation means based on the status data of the various elements of the system.

The sources of calories can, for example, be formed by the heat engine, the power electronics supplying the electric engine, the calories storage S1, the battery, the air outside the vehicle, the electrical resistors RE1, RE2, RE3, etc. The sources of frigories can be formed, for example, by the outside air or the frigories storage S2, for example. Of course, there can be other sources of calories or frigories.

The system also comprises control means able to distribute calories or frigories, available at the said sources, to the elements to be heated or cooled, according to needs. These control means comprise the heat-transfer fluid circuit and refrigerant fluid circuits 1, 2 detailed above and allowing the circulation of calories and frigories to the elements of the vehicle to be heated and/or cooled, but also a component controller, allowing the activation and deactivation of the various components involved in the control of the system, such as, for example, the valves, the pump, the compressor or the fans.

In other words, controlling the system so that it operates in different modes requires the activation/deactivation of many components in a predefined pattern.

Figure 2:
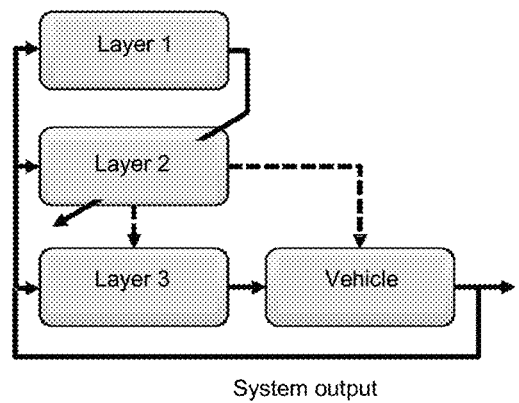
FIG. 2 illustrates the control levels of the thermal-management strategy implemented by the thermal-management system according to the invention.

The system according to the invention aims to implement a hierarchical thermal-management strategy in three levels of control, as illustrated in FIG. 2.

The first level, or layer 1, is the top level of the strategy, dedicated to prediction to optimize the thermal-management of the system. The prediction can be based on a model and/or collected data, which are processed by learning algorithms and/or artificial intelligence techniques to obtain a model of the system, in this case the vehicle and in particular the elements to be cooled and heated and the thermal-management system. Thus, the behaviour of the system can be predicted using the system model, and taking into account, as input data, weather data and/or user habits and/or user preferences and/or the data relating to the journey made, for example.

The second level, or layer 2, is the intermediate level of the strategy, defining the thermal-management of the system in real-time. Taking into consideration the thermal state of the system elements and vehicle elements in real-time, as well as the prediction data of the first level of the strategy, the second level of the strategy selects a suitable and optimized thermal mode to ensure the proper operation of system elements and vehicle elements.

The third level, or layer 3, is the bottom level of the strategy, where the control laws for activating or deactivating the selected components according to the thermal mode selected at the second level of the strategy are defined. Also, this level can include control correctors to ensure an accurate match between the system output and the reference such as, for example, the actual temperature of the passenger compartment and the desired temperature of the passenger compartment.

In a variant on the invention, it is also possible that the second layer manages the activation and deactivation of the various components and that the third layer then issues the appropriate dynamic control laws with respect to the output of the second layer, i.e. the activated or deactivated components.

To implement the first level of the thermal-management strategy, the system illustrated in FIG. 1 further comprises prediction means capable of performing at least one prediction to determine:
whether calories or frigories will be available at a later date from any of the said sources and/or,
whether a need for calories or frigories will exist at a later date at one of the said elements to be heated or cooled.

Figure 3:
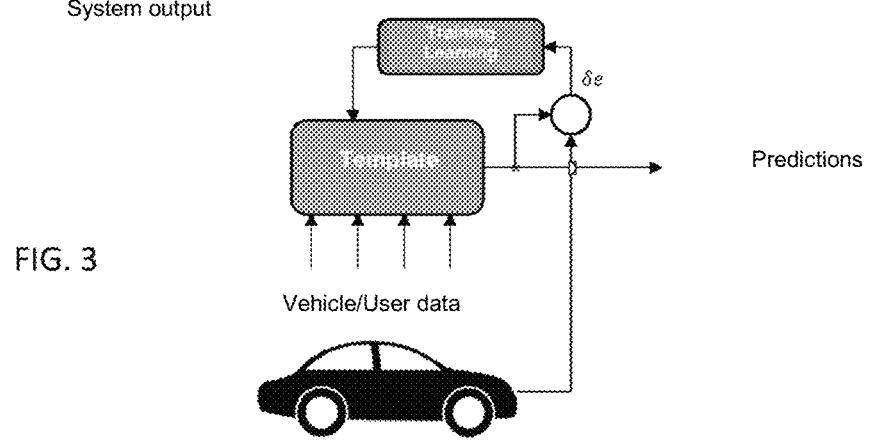
FIG. 3 illustrates an example of a prediction algorithm according to the invention.

The prediction means of the system, implementing the first level of the thermal-management strategy as illustrated in FIG. 2, include a prediction algorithm. An example of the overall architecture is illustrated in FIG. 3.

The real-time machine learning algorithm is used to determine a model that can predict the thermal behaviour of the vehicle and/or the state of the vehicle as well as events. The algorithm aims to establish behavioural patterns based on the user's habits and/or preferences, the user's interactions with the vehicle, as well as vehicle data measured in response to these interactions. This algorithm is fed with the following two types of data:
data measured on the vehicle (battery state of charge, geographical position, time stamp) but also coming from the vehicle user (instructions desired by the user).

These data can be measured in real-time on the vehicle when in use or it can be based on a history of a vehicle previously used. In the latter case, we speak of archived data. It is of course possible to use both measured and archived data;
ground-truth data, which, when compared to the predicted behaviour provided to the learning algorithm, allows the model to be fine-tuned accordingly. The prediction algorithm outputs estimated values of vehicle variables or the status of predefined events, in a fixed or variable time horizon, adjustable for example by the user.

For example, the prediction means is adapted to calculate the subsequent availability of calories and/or frigories, and/or the subsequent need for calories and/or frigories from at least one of the following inputs:
data related to the user's habits and/or comfort preferences, in particular:
data related to the temperature of the vehicle's passenger compartment usually desired by the user,
the airflow rate usually desired by the user in the passenger compartment,
distribution of the airflow usually desired by the user in the passenger compartment, between different air entry points in the passenger compartment, such as air vents,
distribution between the fresh air from outside the passenger compartment and the recycled air from the passenger compartment, usually desired by the user,
the orientation of the air vents usually desired by the user,
data related to the user's driving habits and/or preferences, in particular:
data related to the vehicle's speed,
vehicle's running time,
vehicle's downtime,
vehicle's acceleration,
speed of an internal combustion engine or electric engine of the vehicle,
data related to the user's journey, in particular:
geographical coordinates of the place of departure and/or the place of arrival planned or provided by the user,
real-time geographical coordinates of the vehicle,
meteorological data, such as wind speed and direction, temperature, rainfall, humidity, in particular along the journey, the place of parking and/or the planned place of arrival,
traffic conditions along the journey,
data related to the state of charge of a battery, in particular:
type of battery charge, such as fast charge or normal charge,
expected charging time.

Figure 4:
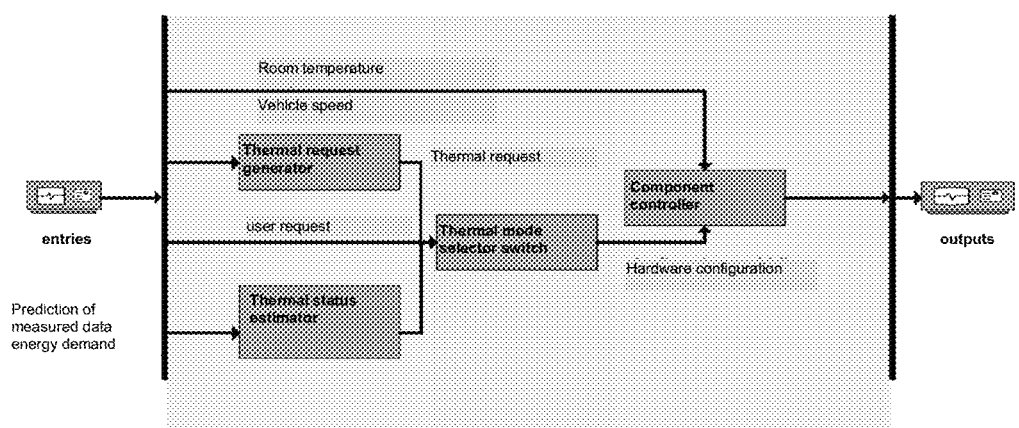
FIG. 4 illustrates a perspective schematic view of the system according to the invention.

Also, the system comprises management means illustrated in FIG. 4, allowing the implementation of the second and third levels of the thermal-management strategy presented in FIG. 2.

These management means comprise a thermal request generator and an estimator of the thermal status of the elements of the vehicle as well as components of the system making it possible, on the basis of input data relating to the state of the elements of the vehicle, and relating to the state of the sources of calories or frigories, to define a thermal request for one or more of the elements of the vehicle to be heated or cooled.

The thermal request of the various vehicle elements can be determined in parallel.

In response to the thermal requests determined for each vehicle element, a thermal-mode selector (see FIG. 4) selects an appropriate hardware configuration.

Figure 5:
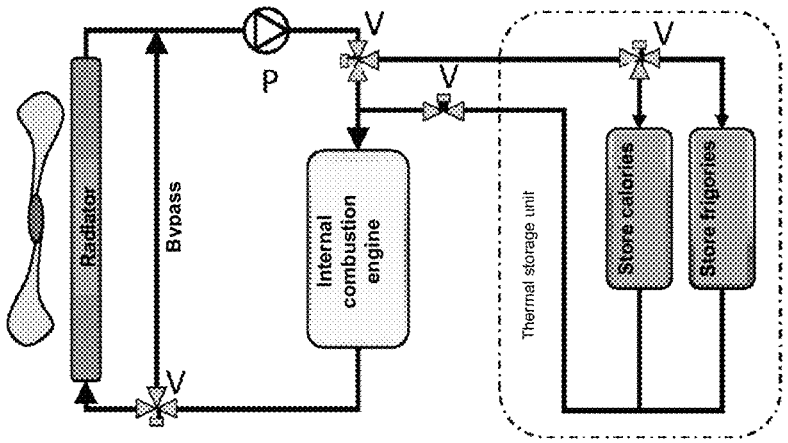
FIG. 5 illustrates an example of a cooling system for an internal combustion engine.
Figure 6:
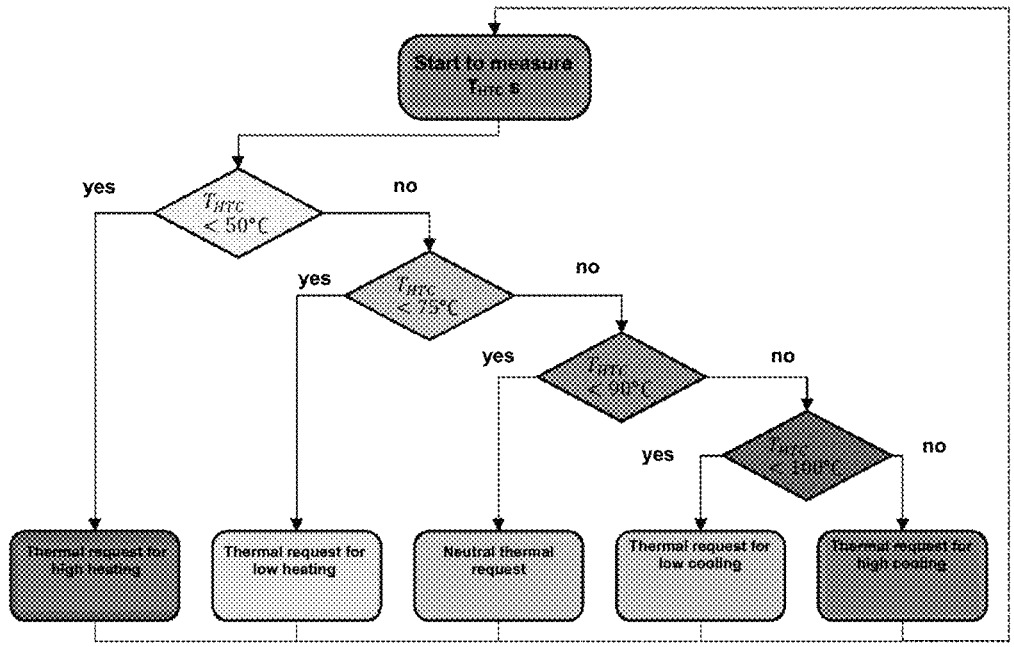
FIG. 6 is an operating flowchart for a thermal-request generator of an internal combustion engine according to the invention.

FIG. 6 illustrates an operating flowchart representing an example of a thermal-request generator for an internal combustion engine, the cooling circuit of which is visible in FIG. 5.

The cooling system of the internal combustion engine of the vehicle is integrated in the system described with reference to FIG. 1. This circuit can be noted HTC (High Temperature Circuit). It comprises, for example, a radiator, one or more pumps P, the internal combustion engine and the thermal storage comprising a calories storage and a frigories storage and three-way valves V for connecting one of the storages to the pump or for disconnecting the thermal storage from the rest of the cooling circuit.

As can be seen in FIG. 6, the thermal requests are determined in relation to the thermal needs of the internal combustion engine (here quantified by means of the temperature of the coolant of the circuit $T_{HTC}$), in order to ensure the operation of the combustion engine under optimal thermal conditions (between 75° C. and 90° C.), as shown in the table below:

| Thermal request for internal combustion engine | High heating request | Low heating request | No thermal request | Low cooling request | High cooling request |
|---|---|---|---|---|---|
| Thermal conditions of the coolant | $T_{HTC} <$ 50° C. | $T_{HTC} <$ 75° C. | 75° C. $<$ $T_{HTC} <$ 90° C. | 90° C. $<$ $T_{HTC} <$ 100° C. | $T_{HTC} >$ 100° C. |
| | Lack of heat | | | | Excess heat |

Thus, according to the coolant temperature, five types of thermal requests can be defined: high heating request, low heating request, neutral thermal request, low cooling request, high cooling request.

For example, during a cold start, the engine coolant temperature is relatively low, so a high heating request is issued to raise the engine coolant temperature as quickly as possible.

Such a thermal request is transmitted to the thermal mode selector, which is capable of defining a thermal operating mode of the system on the basis of the said thermal request. The thermal mode selector allows the heat and cold sources to be used to change the temperature of the thermal coolant in the example of the combustion engine and its cooling circuit as shown in FIG. 5. Also, the thermal mode selector can take into consideration the values and events predicted by the prediction means.

Figure 7:
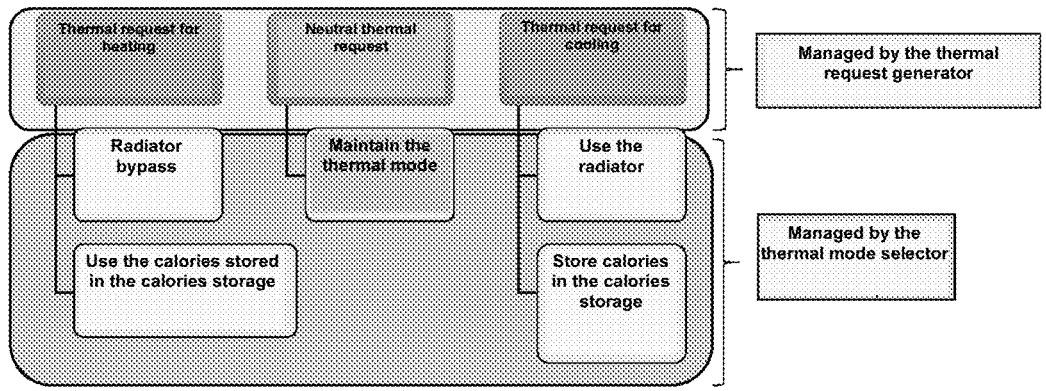
FIG. 7 illustrates the use of different thermal modes of operation according to the thermal requests issued for an internal combustion engine and gives an example of a cooling circuit.

As illustrated in FIG. 7, for each thermal request generated by the thermal-request generator for the internal combustion engine, according to the configuration of the cooling circuit, several solutions are possible to provide cooling or heating according to the thermal request. In the example of the internal combustion engine, in response to a heating request, the thermal mode selector can ensure that the thermal coolant bypasses the radiator and/or utilizes the heat available in the calories storage. Similarly, in response to a request for cooling, the thermal mode selector can ensure that the thermal coolant flows through the radiator and/or uses the frigories available in the frigories storage. The thermal mode selector chooses the best options based on the target temperature, real-time temperature and/or system predictions.

Figure 8:
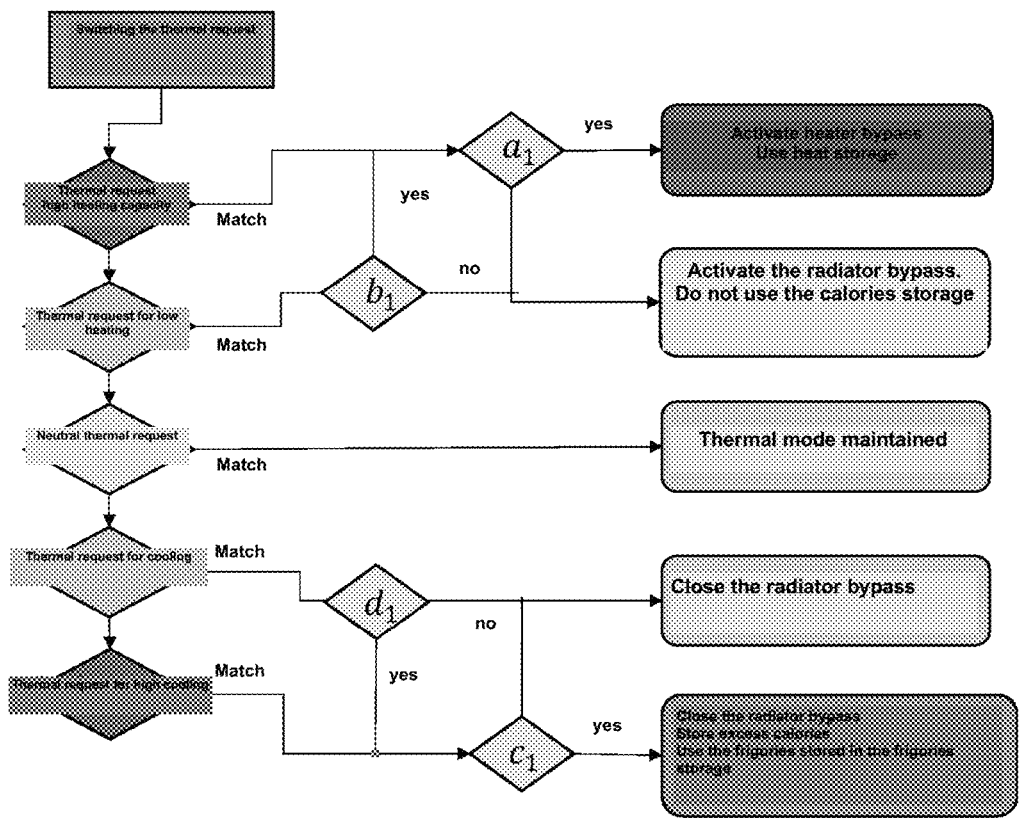
FIG. 8 illustrates an operating flowchart for a thermal operating mode selector for an internal combustion engine with respect to the thermal requests issued.

FIG. 8 illustrates an example of an operating flowchart for the thermal mode selector for the cooling system of the internal combustion engine. According to the thermal request, a thermal operating mode is selected, which configures the circuit differently.

If a high heating request is issued, then the calories storage can be used in addition to the radiator coolant bypass, if calories are available at the calories storage (i.e., if condition a1 is true).

If a low heating request is issued, then the available calories in the calories storage are not used, unless an event leading to excess heat is predicted during the period of vehicle use (i.e., if condition b1 is true).

When the coolant temperature is satisfactory (neutral thermal request), the thermal mode of the system is maintained or retained.

If a low cooling request is issued, then the radiator bypass is closed by default. If an event leading to excess cold input is predicted over the period of use of the vehicle (i.e., if condition d1 is true), the stored frigories can be used, if frigories are available at the frigories storage.

In case of a high cooling request, then the excess heat can also be redirected to the calories storage in combination with the closing of the radiator bypass. The stored frigories can also be used (in the case where frigories are available at the frigories storage, i.e., if condition c1 is true).

Once the thermal operating mode is selected, a component controller (see FIG. 4) implements the third level (layer 3, see FIG. 2) of the thermal-management strategy.

The component controller is capable of operating the system's actuators (valves, fans, pumps) in order to operate the system according to the selected operating mode.

Thus, the component controller monitors and controls the dynamic behaviour of the system's components. It translates, in binary language (0 or 1), the configuration of the circuit of the selected thermal operating mode. The component controller can be, for example, an implementation of a PID controller, a fuzzy logic system, or an optimal control system, thus allowing dynamic control of the components. For example, in response to a high heating request for the vehicle's batteries, the thermal mode selector will choose to generate and recover calories from the positive temperature coefficient (PTC) resistors. The dynamic control of the second level of the strategy (layer 2, FIG. 2) is then carried out, so as to actively control the current flowing through the electrical resistors according to the temperature evolution of the batteries. This control loop ensures that the thermal power dissipated by these resistors is reduced as the temperature of the batteries increases.

Thus, a vehicle thermal-management method for implementing the thermal-management strategy by a system according to the invention comprises the steps that consist in:
  making at least one prediction to determine:
    whether calories or frigories will be available at a later date from any of the said sources and/or,
    whether a need for calories or frigories will exist at a later date at one of the said elements to be heated or cooled.
  distributing the calories or frigories available at the sources to the elements to be heated or cooled, as required, in particular according to the said prediction.

Of course, the thermal-management strategy implemented by the thermal-management system according to the invention makes it possible to thermally manage all the elements of the vehicle that need to be cooled or heated, such as the battery, the passenger compartment and the on-board power electronics (electric engine, inverter and power converters). It is also possible that at least one source of heat and/or cold also forms an element to be heated or cooled, according to the operating conditions of the vehicle.

For example, in the particular case of batteries, these can be suitable for forming a source of calories or frigories and/or suitable for forming a heating or cooling element. In fact, when they give off heat, some of the calories created can be stored in the calorie storages of the system according to the invention. Also, when their temperature is low, some of the frigories can be transferred to the frigories storages of the system.

The battery can be mounted in a housing containing a phase-change material capable of storing calories and/or frigories.

As in the case of the combustion engine, the thermal system implementing the thermal-management strategy is configured to ensure an optimal operating temperature for the batteries.

Figure 9:
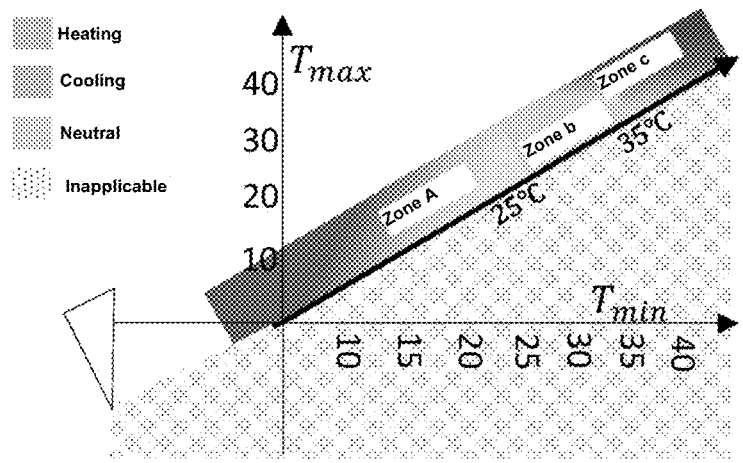
FIG. 9 illustrates the thermal tolerances of the on-board batteries in an electric or hybrid vehicle. The operating temperature ranges shown are examples for an Li+ battery.
Figure 10:
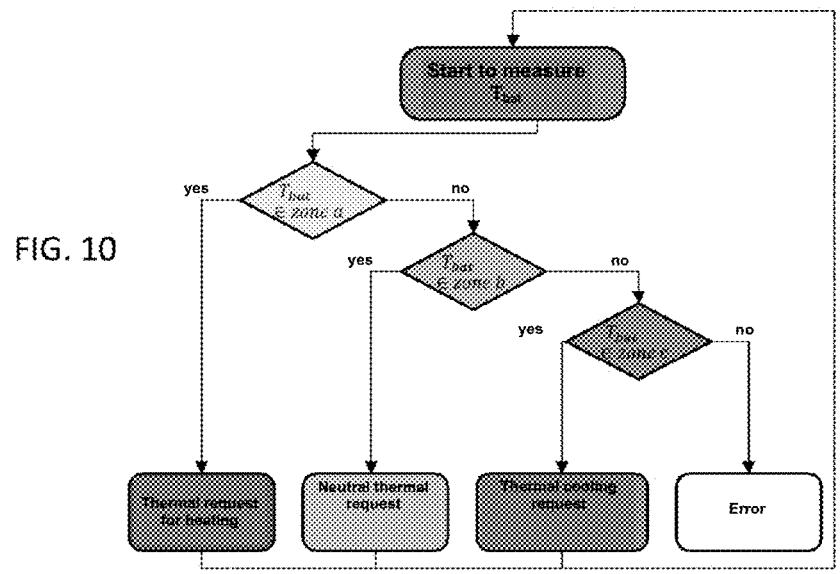
FIG. 10 illustrates an operating flowchart for a thermal-request generator of a battery.

As can be seen in FIG. 9 in connection with FIG. 10, the temperature range of between 25° C. and 35° C. allows for optimal battery operation. Above a temperature of 40° C., the batteries deteriorate. To ensure optimal battery operation, several areas of the battery can be individually monitored so that none of these areas has a temperature above 40° C.

As can be seen in FIG. 10, the thermal request generator takes into consideration the risk of damage so that none of the battery's zones have a temperature Tbat higher than the critical temperature of 40° C. The thermal requests are established according to the states of the temperature sensors dedicated to each zone.

Tmin and Tmax are defined, respectively, as the minimum and maximum temperatures measured by the various temperature sensors in the different zones at a given time.

The difference between Tmax and Tmin must not exceed 10° C. at any time. If this is not the case, the system will be found to be malfunctioning, e.g., due to the failure of one of the temperature sensors or a poorly designed battery pack.

A request for heating is issued when the temperatures Tmin and Tmax are respectively lower than 25° C. and 35° C. (zone a).

No thermal request is issued if Tmin is between 25° C. and 35° C. and if Tmax is less than 40° C. (zone b).

A cooling request is issued if Tmin is greater than 35° C. and/or Tmax is greater than 40° C. (regardless of Tmin—zone c).

In response to the type of thermal request issued, the thermal operating mode selector configures the system according to the invention.

In the case of batteries, heating requests are usually encountered when starting the vehicle from cold, or when switching from engine use to battery use in cold weather.

Figure 11:
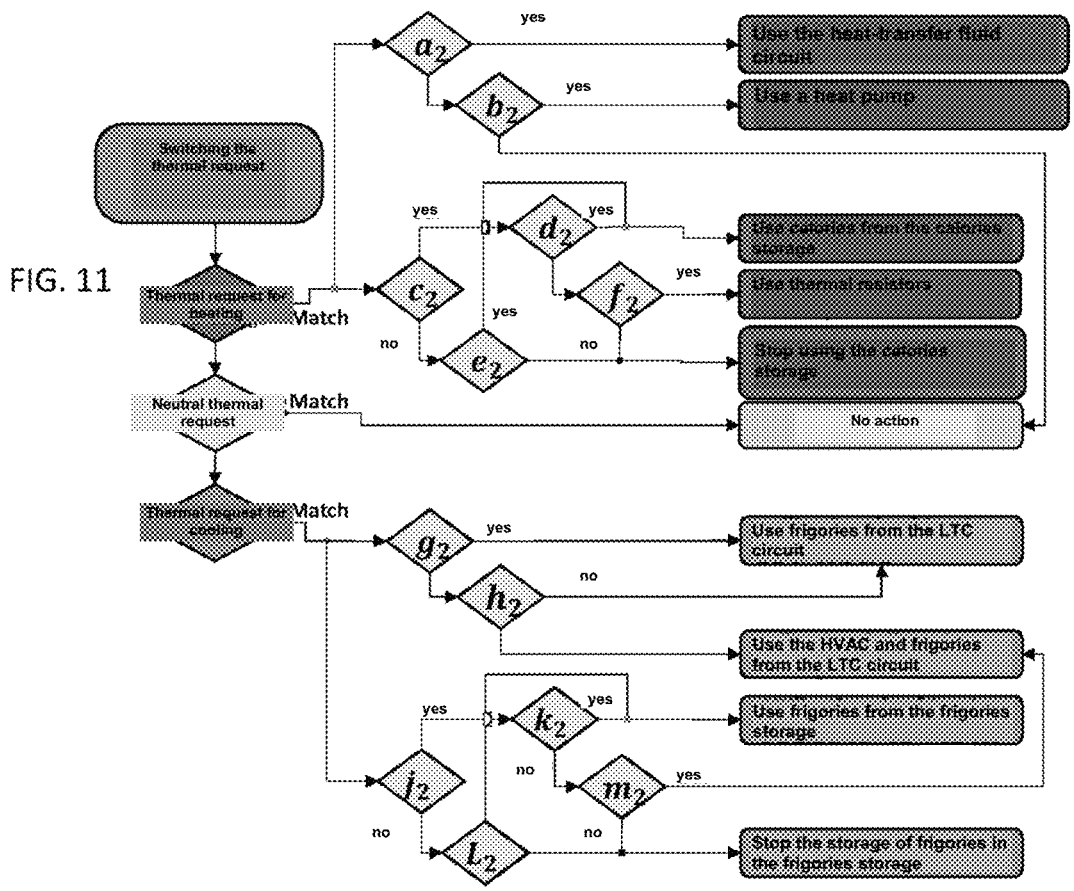
FIG. 11 is an operating flowchart for a thermal operating mode selector for batteries, with respect to the thermal requests issued.

As shown in FIG. 11, in the case of a thermal heating request for the battery, the thermal mode selector checks whether:

the heat-transfer fluid and/or refrigerant fluid circuits provide sufficient heat (condition a2): in the event that these circuits do not transport sufficient heat (i.e., if condition a2 is false, for example when the combustion engine is not operating), the selector checks whether the level of energy available via the battery or via the fuel available in the vehicle (condition b2) is sufficient to ensure heating via the refrigerant fluid circuit and the heat pump type operating mode, or via the electrical resistors.

The energy level check typically consists of ensuring that at least 30% of the maximum capacity of the batteries $So_{max}^{bat}$ is available. This verification can also take into account the estimation of this energy level when arriving at the destination. Using such a prediction, the energy-level condition b2 shall be based on the real-time estimation of the remaining driving distance and/or the distance needed to reach the next battery charging or fuel tank filling location.

the vehicle is started when it is cold (condition c2): in the case where the vehicle is started when it is cold (condition c2 is true), the calories available in the storage (if any calories are available, i.e., if condition d2 is true) are used to rapidly increase the battery temperature, in order to ensure a rapid start under good conditions. If there are no calories available at the calories storage (i.e., if condition d2 is false), then the electrical resistors are used if the battery charge level (or fuel level) is sufficient (i.e., if condition f2 is true).

Similar to what has been described in relation to the internal combustion engine, if excess heat is predicted (i.e., if condition e2 is true), then the stored calories can be used for other operating situations than cold start.

If there is no prediction of excess heat (i.e., if condition e2 is false), then the use of stored heat is suspended.

In the case of a neutral thermal request for the battery, the thermal mode selector does not control any heat exchange between the battery and the heat or cold sources.

It is possible to provide cooling for the batteries under the following conditions: very hot weather, fast charging mode, heavy load on board the vehicle.

In the case of such a cooling request, a heat-transfer fluid circuit called LTC (Low Temperature Circuit) is used by default. The LTC circuit is designed to cool the vehicle's electric engine or battery. The temperature of the heat-transfer fluid in the LTC circuit is lower than in the HTC circuit. For example, the temperature of the heat-transfer fluid in the HTC circuit is between 75 and 90° C. while the temperature of the heat transfer fluid in the LTC circuit is between 20 and 70° C.

If the heat-transfer fluid in the LTC system is not at a sufficiently low temperature (i.e., if condition g2 is false), the thermal mode selector will choose to use the HVAC Heating, Ventilation and Air Conditioning) system if the battery charge level permits (i.e., if condition h2 is true). For battery cooling under transient hot start conditions (i.e., if condition j2 is true), the thermal mode selector switch defaults to using the frigories available in the frigories storage. In the case where the available refrigeration in the frigories storage is not sufficient (i.e., if condition k2 is false), the heating, ventilation and/or air conditioning system shall be used if the charge level of the battery allows it (i.e., if condition m2 is true). If excess cooling is predicted (i.e., if condition 12 is true), the thermal mode selector can allow the frigories storage to be used in any case (i.e. even outside a warm start).

Figure 12:
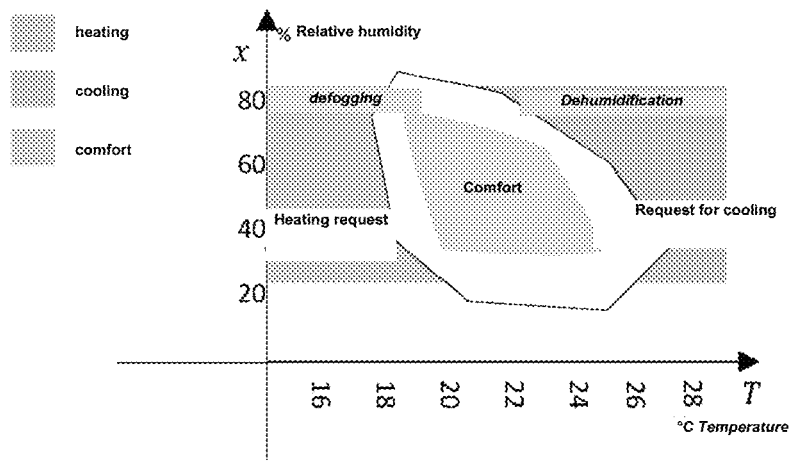
FIG. 12 illustrates the comfort conditions for a passenger in the passenger compartment of the vehicle.

In the particular case of thermal-management of the passenger compartment, a device for heating, ventilating and/or conditioning a passenger compartment is included in the system and is parametrised to manage the temperature of the passenger compartment. The management of the passenger compartment temperature is performed to ensure that the temperature and humidity conditions in the passenger compartment are maintained to ensure passenger comfort. As can be seen in FIG. 12, comfort is provided when the passenger compartment temperature is between 18° C. and 26° C. and the humidity is between 30 and 80%. Temperature and humidity are measured in the passenger compartment by means of temperature and humidity sensors. The heating, ventilation and/or air conditioning (HVAC) device, dedicated to the passenger compartment of the vehicle, comprises, as illustrated in FIG. 1:

- a refrigerant fluid circuit 2,
- a heat-transfer fluid circuit 1,
- a heat exchanger E2 capable of exchanging heat between the heat-transfer fluid and the air intended to enter the passenger compartment of the vehicle,
- a heat exchanger E4 capable of exchanging heat between the refrigerant fluid and air intended to enter the passenger compartment of the vehicle and capable of forming a condenser,
- a heat exchanger E6 capable of exchanging heat between the refrigerant fluid and air intended to enter the passenger compartment of the vehicle and capable of forming an evaporator,
- at least a heat exchanger E1, capable of exchanging heat between the refrigerant fluid and the heat-transfer fluid,
- the control means being capable of distributing the calories or frigories between the sources and the elements to be heated and/or cooled, through the refrigerant fluid circuit 2, the heat-transfer fluid circuit 1 and/or the said exchangers E1, E2, E4, E6.

The heating, ventilation and/or air conditioning device for the passenger compartment can also comprise a heat exchanger capable of exchanging heat between, firstly, the heat-transfer fluid or refrigerant fluid, and secondly, hot gases from an exhaust line of the vehicle.

Thus, the battery, the heat and/or cold stores and, in general, all the sources of calories or frigories in the vehicle are able to exchange heat with the heat-transfer fluid.

In the case of the passenger compartment, the thermal needs are formulated with regard to passenger comfort, taking into account both the temperature of the passenger compartment and the level of humidity.

The thermal requests are defined according to the following data:
- the temperature difference between the temperature of the passenger compartment Tc and the temperature desired by the user Tu;
- the humidity measured in the passenger compartment xc
- the ambient temperature Tam.

In nominal operation, the sources of heat used to heat the passenger compartment are (in order of priority and subject to availability): the cooling circuit of the HTC thermal engine and the heat pump. In a transient operating mode, the sources of heat used to heat the passenger compartment are the following (in order of priority and subject to availability): the calories storage and the positive temperature coefficient (PTC) resistors.

Figure 13:
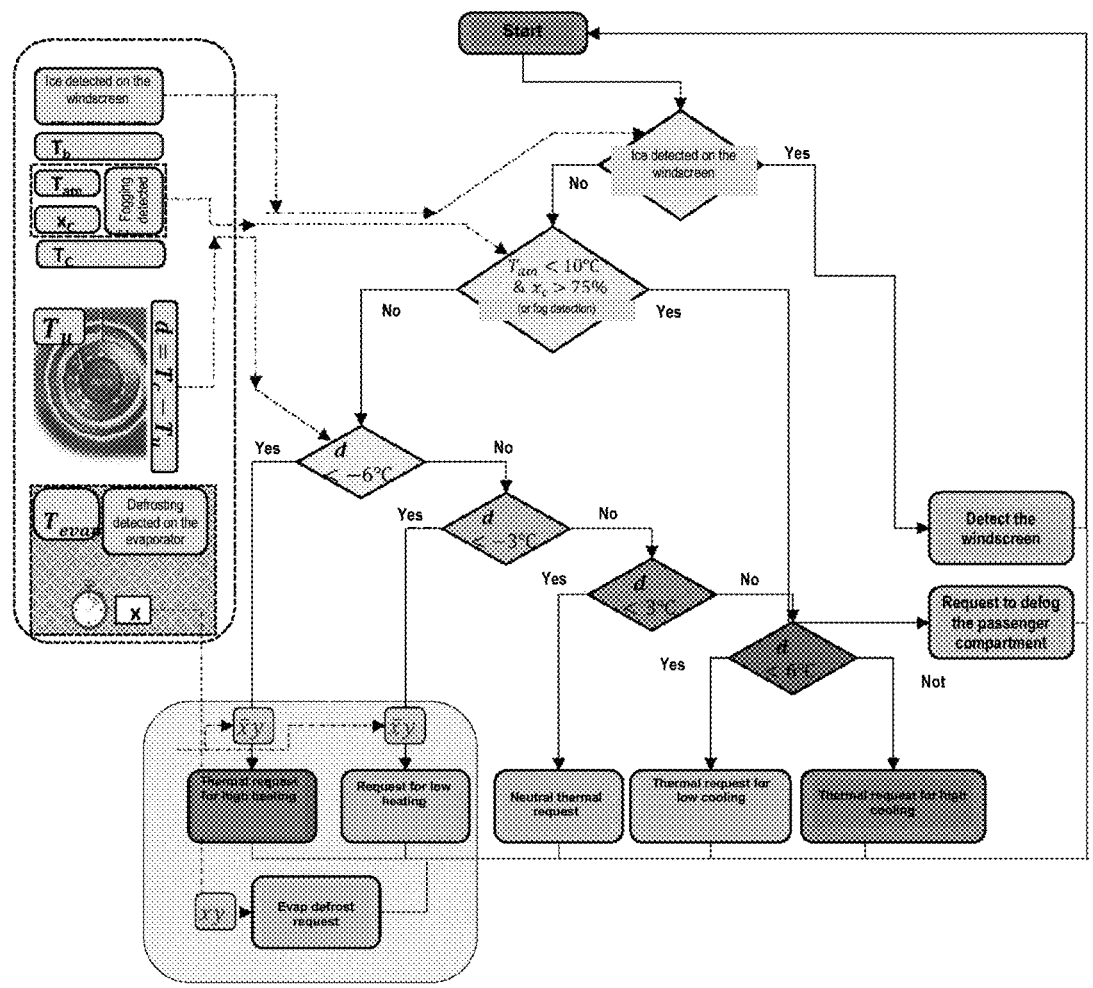
FIG. 13 is an operating flowchart for a thermal operating mode selector for the passenger compartment of a vehicle, with regard to the thermal requests issued.

The thermal requests are defined as shown in FIG. 13, illustrating as shown in the table below:

| thermal needs for the passenger compartment | High heating request | Low heating request | No thermal request | Low cooling request | High cooling request |
|---|---|---|---|---|---|
| Humidity and temperature conditions | $T_C - T_U < -6°\ C.$ | $-6°\ C. < T_C - T_U < 3°\ C.$ | $T_C = T_U \pm 3$ | $3°\ C. < T_C - T_U < 6°\ C.$ | $T_C - T_U > 6°\ C.$ |

Special thermal requests are defined in the following cases:

windscreen demisting: when the humidity level in the passenger compartment is high or the outside temperature is low, the windscreen fogs up. Demisting can be requested by the user or automatically requested when Tamb<16° C. and xc>75%, or when fogging is optically detected by an optical sensor.

windscreen defrosting: the defrosting is activated either by detecting ice on the windscreen or by a request from the vehicle user.

frost layer on the external evaporator of the system (see for example exchanger E5 in FIG. 1): a defrosting request of the evaporator is carried out cyclically or according to the evaporator temperature. Frost on the evaporator can reduce the overall efficiency of the system.

Figure 14:
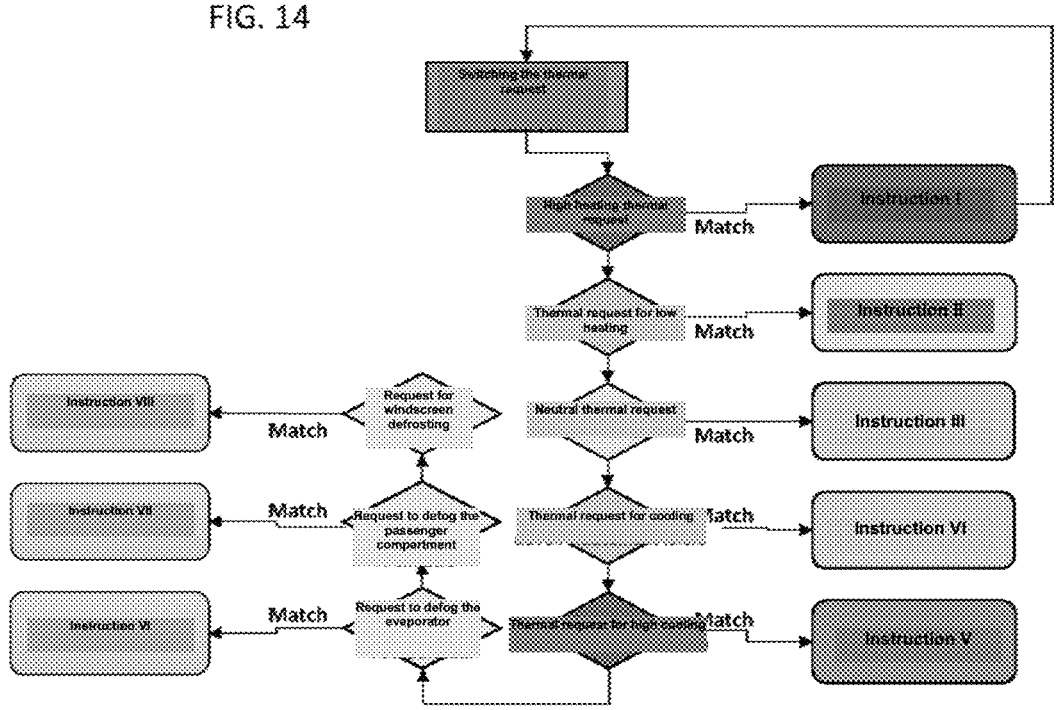

FIG. 13 illustrates the thermal request generator for thermally managing the passenger compartment, as previously described. The selection of eight types of thermal requests is illustrated in FIG. 14, showing the thermal mode selector. As can be seen, the selection is made with regard to input data that can come from analog and/or digital sensors, the vehicle's dashboard, or events.

As a priority, the thermal query generator analysis, whether ice or mist is detected on the windscreen. Such a detection is done automatically by means of sensors (temperature and/or humidity and/or optical). If fogging and/or frosting is detected, a request for defrosting and/or dehumidification is issued. In the opposite case, the algorithm determines the thermal needs of the vehicle's passenger compartment.

The selection of the thermal request is based on the value of the difference between the temperature of the passenger compartment and the desired temperature. Based on the size of this difference, the five thermal demands are scaled from high heating demand to high cooling demand, as described above.

When heating is required, defrosting of the evaporator can be necessary when using the heating, ventilation and/or air conditioning system of a passenger compartment, especially in heat pump mode. The thermal request for heating is then put on hold and a request for defrosting the evaporator is formulated and maintained according to parameters such as the evaporator temperature, the signal from the optical sensor and/or during a predefined time cycle.

When cooling is required (low or high), it is possible, to dehumidify the passenger compartment air (when the passenger compartment is fogged), the temperature of the supply air inside the passenger compartment can be reduced to below the comfort range temperatures. To return to a comfortable temperature, heating is required to warm the air following the reduction in humidity.

Requests for evaporator defrost and dehumidification are issued and managed automatically by the thermal request generator, based on measured data and events.

Thus, for the passenger compartment, eight thermal queries are defined:
- thermal request for high heating;
- thermal request for low heating;

neutral thermal request;
thermal request for high cooling;
thermal request for low heating;
request for dehumidification of the passenger compartment;
request to defrost the windscreen;
request to defrost the evaporator.

In response to each request, the thermal mode selector associates, with each thermal request, a set of instructions configuring operating modes of the system according to the invention. The overall architecture of the thermal mode selector algorithm for passenger compartment thermal requests is shown in FIG. 14. The instructions are shown in FIGS. 15a to 15h.

In response to a high heating demand (FIG. 15a), air recirculation is promoted to reduce the thermal load. In a transient operating mode, this decision is made for a short period of time (i.e. for a maximum of 10 minutes), the time required to reach the climatic conditions of a nominal operating mode. The selector switches to using the heat from the HTC circuit, after checking that the coolant temperature is high enough (i.e., if condition a3 is true). If the calories available at the HTC circuit are not sufficient or not available (i.e., if condition a3 is false), the selector switches so that the electrical sources are used. The battery charge level (and/or fuel level) is checked against the remaining driving distance evaluated by the prediction means, so that the heat pump and/or positive temperature coefficient (PTC) resistors are used. These two options are used when the energy level and the available range are high or when the vehicle is connected to the electrical grid (i.e., if condition b3 is true or if condition f3 is true).

When the calories in the HTC circuit are available and are used, the thermal mode selector sends instructions to store excess calories in the calories storage if the calories storage level is low (i.e., if the h3 condition is false).

If the heat pump is used, the cold generated at the evaporator can be stored in the frigories storage if the cold store has a low level (i.e., if condition g3 is false).

In the case of a transient operating mode such as a cold start of the vehicle (i.e., if condition c3 is true), in order to allow a quick adjustment of the passenger compartment temperature, the thermal mode selector uses the calories storage as an additional source of heat. If the calories level of the calories storage is not sufficient (i.e., if condition d3 is false), then the electrical resistors shall be used if the battery charge level and/or the fuel level allows it and/or the vehicle is connected to the electric network (i.e., if condition f3 is true).

When excess heat is predicted, the thermal mode selector allows the available calories in the calories storage to be used outside of the transient situation such as a cold start (i.e., if condition e3 is true).

Figure 15A:
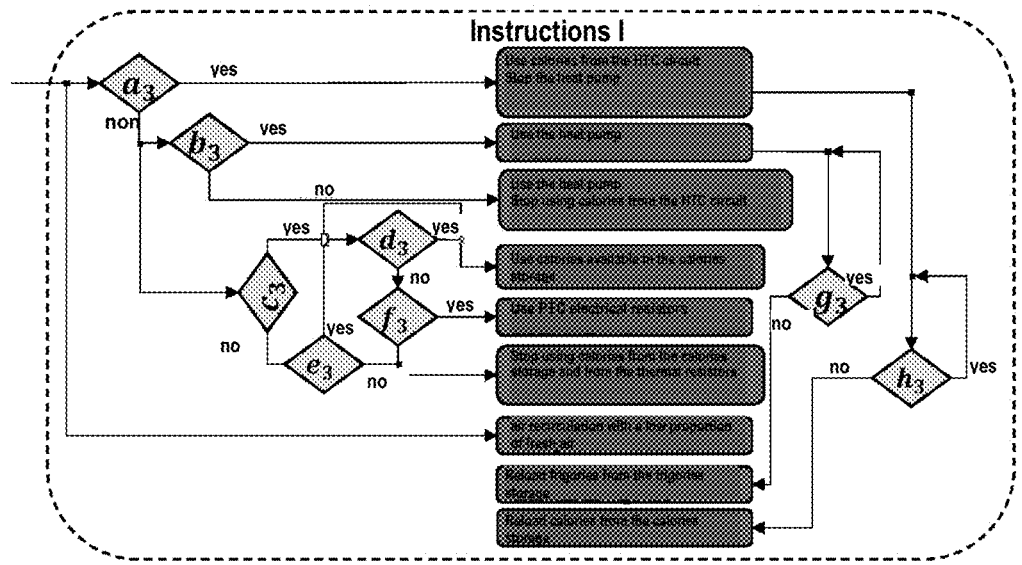
FIGS. 15a to 15h illustrate the instructions of the operating mode selector in response to the thermal requests issued.
Figure 15B:
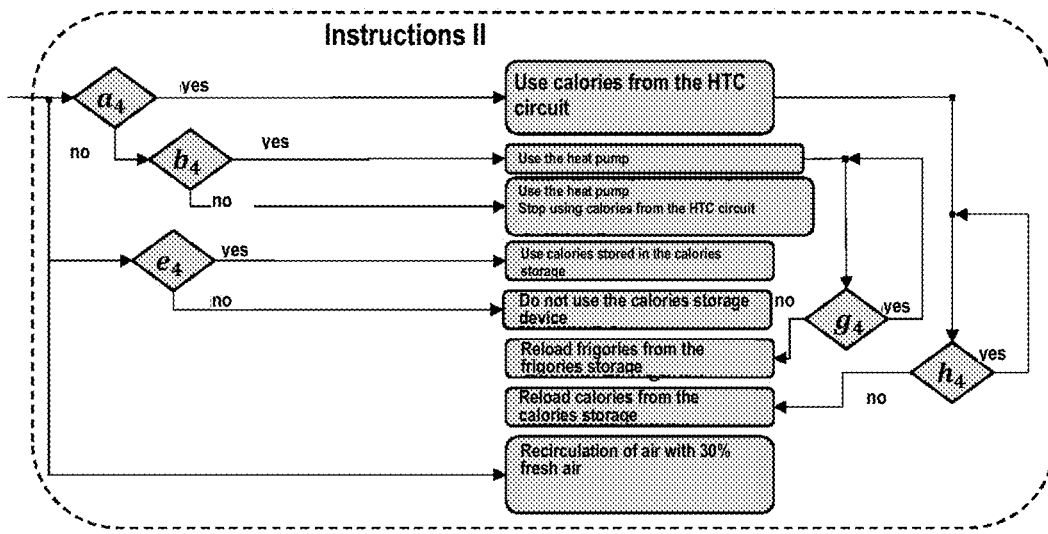

As shown in FIG. 15b, in response to a low heat request, logic similar to that applied to a high heat request (FIG. 15a) is used. However, in contrast to a high heating demand, the cold start situation is not applicable. Moreover, it should be noted that the air recirculation is only partial. The airflow used can be composed of, for example, about 70% recycled air and 30% fresh air, i.e., air from outside the passenger compartment.

Figure 15C:
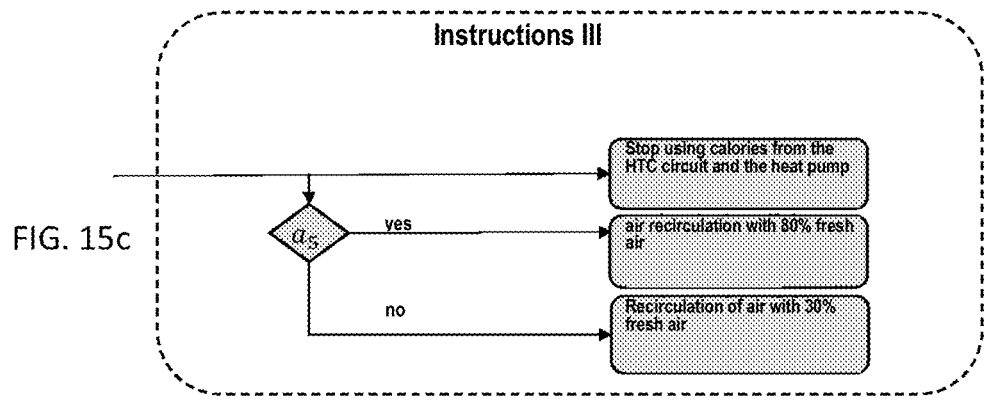

In the case of a neutral thermal request, the instructions for which can be seen in FIG. 15c, neither the HTC circuit nor the heating, ventilation and/or air conditioning device is used by default. The selector sends instructions to check whether the ambient temperature (outside the vehicle) is close to the temperature desired by the vehicle user (i.e. whether condition a5 is true). The proportion of fresh air (i.e. outside the passenger compartment) introduced into the passenger compartment varies according to the difference between the ambient temperature and the target temperature of the passenger compartment (if this difference is less than or greater than 2° C.—i.e., if condition a5 is true).

Figure 15D:
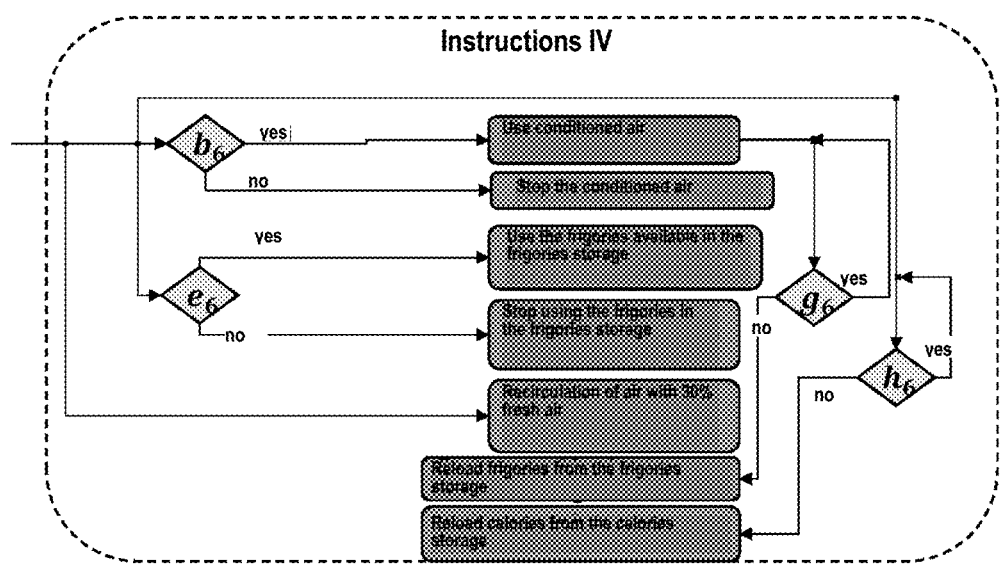

In the case of a low cooling request and as illustrated in FIG. 15d, by default, if the calories level of the calories storage is not equal to 100% (i.e., if condition h6 is false), then the calories storage is recharged.

The cooling mode is activated if the energy level allows this (i.e., if condition b6 is true). Air recirculation is less used. The energy threshold for the use of air conditioning is set based on the prediction of the remaining driving distance to the next destination and/or charging station. At the same time, if the level of the frigories storage is not 100% (i.e., if condition g6 is false), then the frigories storage is recharged.

If an excess of frigories is predicted (i.e., if condition e6 is true), then the frigories available at the frigories store are used.

Whenever an excess of frigories is predicted (i.e., if condition e6 is true), the thermal mode selector sends instructions to use the available calories in the calories storage outside the special case of a hot start of the vehicle.

Figure 15E:
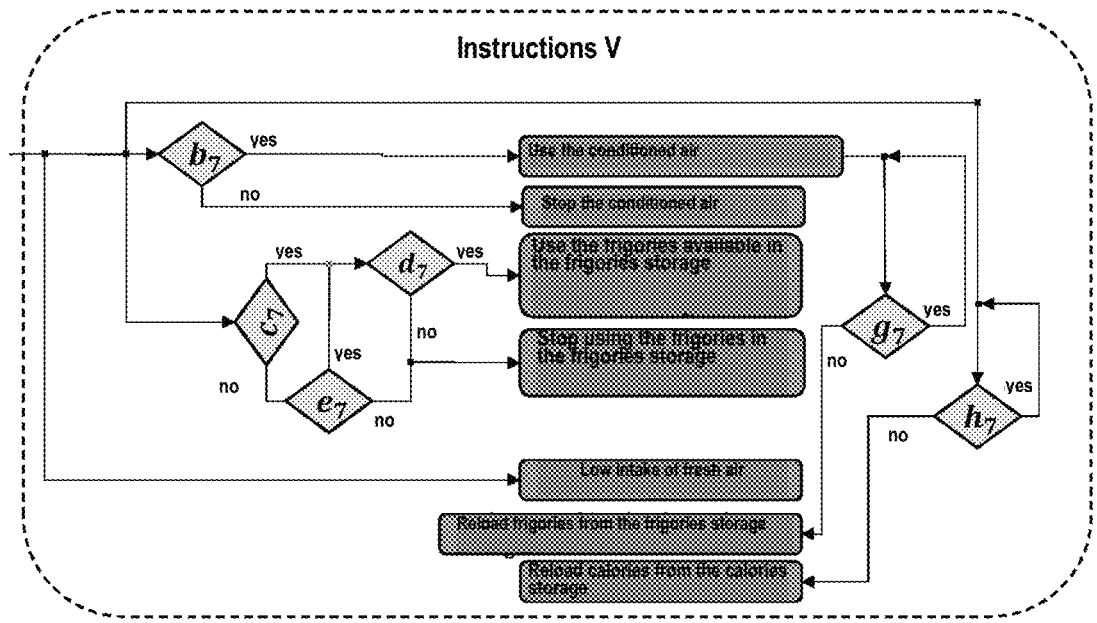

In response to a high cooling request and as illustrated in FIG. 15e, by default, if the calories level of the calories storage is not equal to 100% (i.e., if condition h7 is false), then the calories storage is recharged.

By default, air recirculation is used and, if the energy level allows this (condition b7 is true), air conditioning is used. At the same time, if the level of the frigories storage is not 100% (i.e., if condition g7 is false), then the frigories storage is recharged. If frigories are available at the frigories storage (i.e., if condition d7 is true), then the frigories storage is used in addition to the air conditioning to overcome a transient load during a hot start (i.e., if condition c7 is true). If an excess of frigories is expected (i.e., if condition e7 is true), then the frigories available in the frigories store are used.

Figure 15F:
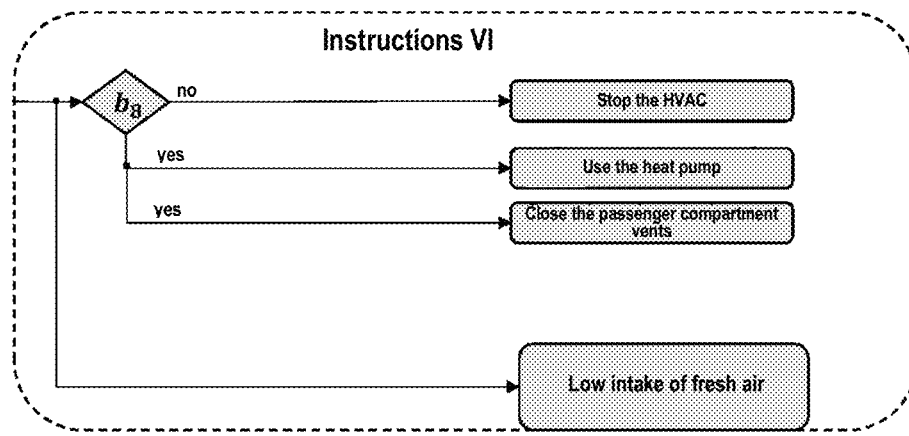

In the case of an evaporator defrost request and as shown in FIG. 15f, by default, a low flow of fresh air is introduced into the vehicle's passenger compartment. If the battery charge level is sufficient (i.e., condition b8 is true), then the heat pump starts or continues to operate and the vents on the front of the instrument panel are closed so that most of the warm air is directed towards the windscreen.

Figure 15G:
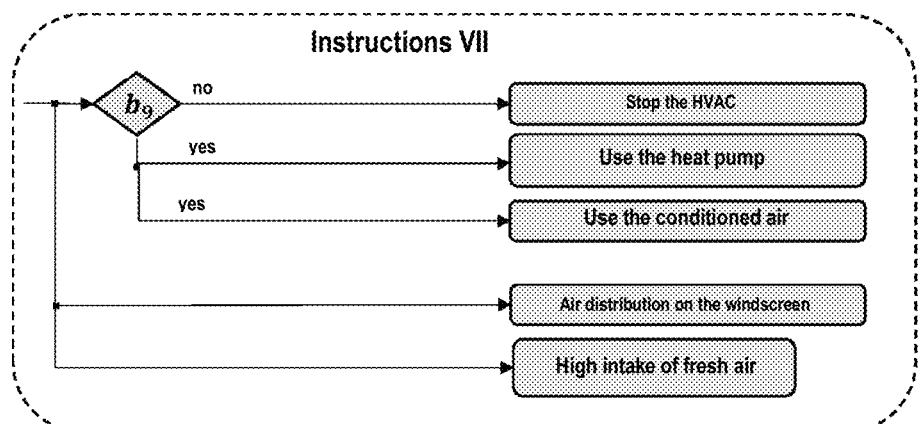

In the case of a passenger compartment dehumidification (i.e. demisting) request, as illustrated in FIG. 15g, the heating, ventilation and/or conditioning device is used in both cooling (air conditioning) and heating (heat pump) modes. The evaporator reduces the humidity while the condenser warms the air to a comfortable temperature. A larger fresh air intake (outside) can be set as well as an air distribution to target the front and rear windscreens. However, these actions are conditional on a high energy level, i.e., a high battery charge level and/or a high fuel level or the vehicle connected to a recharge (condition b9 is true). The energy level can be assessed in relation to the intended destination.

Figure 15H:
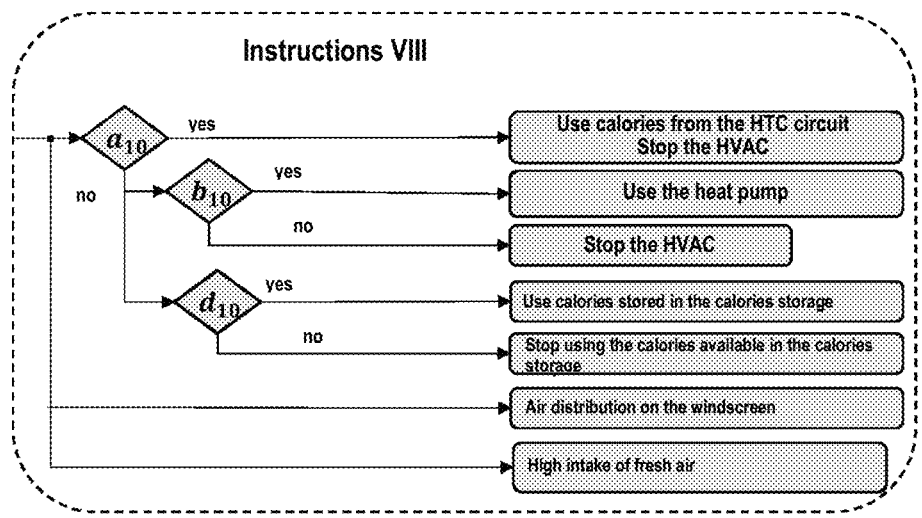

In the case of a windscreen defrosting request, as shown in FIG. 15h, the calories in the HTC circuit are used if they are available (i.e., if condition a10 is true). If these calories are not available, the heat pump is activated if the energy level allows this (i.e., if condition b10 is true). The energy level can be assessed in relation to the intended destination. The calories storage can be used to increase the temperature, if heat is available (i.e., if condition d10 is true). In addition, by default, the thermal mode selector generates an air distribution on the windscreen as well as a significant intake of fresh air, in order to lower the humidity level.

Instructions from the thermal mode selector are sent to the component controller to configure the operation of the system according to the invention in response to the thermal request.

In the case of thermal conditioning of power electronics, only two thermal requests can be issued by the thermal requests generator:
neutral request, and this by default,
cooling request whenever the temperature of the vehicle's power electronics is above 40° C.

Figure 16:
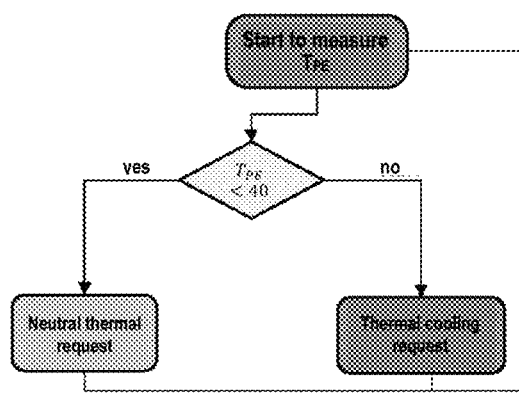
FIG. 16 illustrates an operating flowchart of a request generator of the power electronics on board the vehicle.

The operating flowchart for the thermal request generator is shown in FIG. 16, where the TPE temperature condition is used to issue either a neutral request or a cooling request.

In the case of a thermal request for cooling the power electronics, the LTC circuit is used to transport the heat dissipated by the power electronics. In response to a neutral thermal request, cooling via the LTC circuit is interrupted.

The invention claimed is:

1. A thermal-management system for a vehicle comprising:
at least one calories and/or frigories storage (S1, S2) forming a source of calories or frigories,
at least one element of the vehicle to be heated or cooled,
at least one additional source of calories or frigories,
detection means adapted to detect whether calories or frigories are available at one of the said sources,
control means able to distribute the calories or frigories available at the sources to the elements to be heated or cooled, according to transient or nominal needs,
characterized in that it comprises prediction means capable of making at least one prediction aimed at determining:
whether calories or frigories will be available at a later date from any of the said sources and/or,
whether a need for calories or frigories will exist at a later date at one of the said elements to be heated or cooled,
and in that it comprises management means capable of:
defining a thermal need for one or more of the elements of the vehicle to be heated or cooled and/or an electrical need for one or more of the elements of the vehicle to be supplied electrically, on the basis of input data relating to the state of the elements of the vehicle to be heated or cooled, and relating to the state of the sources of calories or frigories, of a request from a user and/or of a prediction,
defining an operating mode of the system on the basis of the said thermal need, the said electrical need and/or a prediction,
operating the system's actuators, so as to operate the system according to the chosen operating mode.

2. A system according to claim 1, characterized in that the prediction means are capable of calculating the subsequent availability of calories and/or frigories, and/or the subsequent requirements for calories and/or frigories from at least one of the following input data:
data related to the user's habits and/or comfort preferences, in particular:
data related to the vehicle's interior temperature usually desired by the user,
the airflow rate usually desired by the user in the passenger compartment,
distribution of the airflow usually desired by the user in the passenger compartment, between different air-entry points in the passenger compartment, such as air vents,
distribution between the fresh air from outside the passenger compartment and the recycled air from the passenger compartment, usually desired by the user,
the orientation of the air vents usually desired by the user,
data related to the user's driving habits and/or preferences, in particular:
data related to the vehicle's speed,
vehicle's running time,
vehicle's downtime,
vehicle's acceleration,
speed of an internal combustion engine or electric engine of the vehicle,
data related to the user's journey, in particular:
geographical coordinates of the place of departure and/or the place of arrival planned or provided by the user,
real-time geographical coordinates of the vehicle,
meteorological data, such as wind speed and direction, temperature, rainfall, humidity, in particular along the journey, the parking place and/or the planned arrival place,
traffic conditions along the journey,
probability that the user will connect an electric battery of the vehicle to an electric charging station within a given time period,
data related to the health of the electric battery,
data related to the state of charge of a battery, in particular:
type of battery charge, such as fast charge or normal charge,
expected charging time.

3. A system according to claim 2, characterised in that at least one calories source and/or frigories source also forms an element to be heated or cooled, according to the operating conditions of the vehicle.

4. A system according to claim 3, characterized in that it comprises at least one battery capable of forming a source of calories or frigories and/or capable of forming an element to be heated or cooled.

5. A system according to claim 1, characterised in that at least one calories source and/or frigories source also forms an element to be heated or cooled, according to the operating conditions of the vehicle.

6. A system according to claim 1, characterized in it comprises at least one calories storage (S1) and at least one frigories storage (S2).

7. A system according to claim 1, characterized in that it comprises at least one battery capable of forming a source of calories or frigories and/or capable of forming an element to be heated or cooled.

8. A system according to claim 7, characterized in that the battery is mounted in a housing accommodating a phase-change material capable of storing calories and/or frigories.

9. A system according to claim 7, characterized in that it comprises a device for heating, ventilating and/or conditioning a passenger compartment of the vehicle, comprising:
a refrigerant fluid circuit (2),
a heat-transfer fluid circuit (1),
a first heat exchanger (E2) capable of exchanging heat between the heat-transfer fluid and the air intended to enter the passenger compartment of the vehicle,
a second heat exchanger (E4) capable of exchanging heat between the refrigerant fluid and the air intended to enter the passenger compartment of the vehicle and capable of forming a condenser, a third heat exchanger (E6) capable of exchanging heat between the refrigerant fluid and the air intended to enter the passenger compartment of the vehicle and capable of forming an evaporator, at least a fourth heat exchanger (E1), capable of exchanging heat between the refrigerant fluid and the heat-transfer fluid, the control means being able to distribute the calories or frigories between the sources and the elements to be heated and cooled, through the refrigerant fluid circuit, the heat-transfer fluid circuit and/or, from the said exchangers.

10. A system according to claim 9, characterized in that the battery is capable of exchanging heat with the heat-transfer fluid.

11. A system according to claim 1, characterized in that it comprises a device for heating, ventilating and/or conditioning a passenger compartment of the vehicle, comprising:
a refrigerant fluid circuit (2),
a heat-transfer fluid circuit (1),
a first heat exchanger (E2) capable of exchanging heat between the heat-transfer fluid and the air intended to enter the passenger compartment of the vehicle,
a second heat exchanger (E4) capable of exchanging heat between the refrigerant fluid and the air intended to enter the passenger compartment of the vehicle and capable of forming a condenser,
a third heat exchanger (E6) capable of exchanging heat between the refrigerant fluid and the air intended to enter the passenger compartment of the vehicle and capable of forming an evaporator,
at least a fourth heat exchanger (E1), capable of exchanging heat between the refrigerant fluid and the heat-transfer fluid,
the control means being able to distribute the calories or frigories between the sources and the elements to be heated and cooled, through the refrigerant fluid circuit, the heat-transfer fluid circuit and/or, from the said exchangers.

12. A system according to claim 11, characterized in that the heating, ventilation and/or conditioning device comprises a fifth heat exchanger capable of exchanging heat between, firstly, the heat-transfer fluid or the refrigerant fluid and, secondly, hot gases from an exhaust line of the vehicle.

13. A system according to claim 11, characterized in that the storage is capable of exchanging heat with the heat-transfer fluid.

14. A system according to claim 1, characterized in that it comprises management means capable of using any surplus electrical energy contained in the vehicle's electric battery, determined according to the prediction made, to supply an intelligent electric network outside the vehicle.

15. A thermal-management method for a vehicle comprising a thermal-management system for a vehicle comprising:
at least one calories and/or frigories storage (S1, S2) forming a source of calories or frigories,
at least one element of the vehicle to be heated or cooled,
at least one additional source of calories or frigories,
detection means adapted to detect whether calories or frigories are available at one of the said sources,
control means able to distribute the calories or frigories available at the sources to the elements to be heated or cooled, according to transient or nominal needs,
characterized in that it comprises prediction means capable of making at least one prediction aimed at determining:
whether calories or frigories will be available at a later date from any of the said sources and/or,
whether a need for calories or frigories will exist at a later date at one of the said elements to be heated or cooled,
and in that it comprises management means capable of:
defining a thermal need for one or more of the elements of the vehicle to be heated or cooled and/or an electrical need for one or more of the elements of the vehicle to be supplied electrically, on the basis of input data relating to the state of the elements of the vehicle to be heated or cooled, and relating to the state of the sources of calories or frigories, of a request from a user and/or of a prediction,
defining an operating mode of the system on the basis of the said thermal need, the said electrical need and/or a prediction,
operating the system's actuators, so as to operate the system according to the chosen operating mode;
the method characterised in that it comprises the steps that consist in:
making at least one prediction to determine:
whether calories or frigories will be available at a later date from any of the said sources and/or,
whether a need for calories or frigories will exist at a later date at one of the said elements to be heated or cooled,
distributing the calories or frigories available at the sources to the elements to be heated or cooled, as required, in particular according to the said prediction.

16. A system according to claim 15, characterised in that at least one calories source and/or frigories source also forms an element to be heated or cooled, according to the operating conditions of the vehicle.

17. A system according to one of claim 16, characterized in that it comprises at least one battery capable of forming a source of calories or frigories and/or capable of forming an element to be heated or cooled.

* * * * *